(12) United States Patent
Sommers et al.

(10) Patent No.: US 6,966,684 B2
(45) Date of Patent: Nov. 22, 2005

(54) OPTICAL WAVE GUIDE

(75) Inventors: Matthew L. Sommers, Sagamore Hills, OH (US); Christopher L. Bohler, North Royalton, OH (US)

(73) Assignee: GELcore, LLC, Valley View, OH (US)

( * ) Notice: Subject to any disclaimer, the term of this patent is extended or adjusted under 35 U.S.C. 154(b) by 265 days.

(21) Appl. No.: 09/682,516

(22) Filed: Sep. 13, 2001

(65) Prior Publication Data

US 2003/0049007 A1    Mar. 13, 2003

(51) Int. Cl.$^7$ ................................................. F21V 7/04
(52) U.S. Cl. ....................... 362/604; 362/626; 362/559; 362/812
(58) Field of Search ................ 362/31, 551, 559, 362/231, 240, 244, 246, 330, 331, 335–339, 362/800, 812, 26, 27, 600, 602, 604, 606, 362/608–610, 612, 623, 625, 626; 116/63 R, 116/63 P, 63 T; 40/544, 546, 557, 563; 340/907, 340/909, 916, 944, 908, 815.43, 815.42, 340/815.45, 815.65

(56) References Cited

U.S. PATENT DOCUMENTS

| | | | | |
|---|---|---|---|---|
| 4,965,950 A | * | 10/1990 | Yamada | 40/546 |
| 5,027,258 A | * | 6/1991 | Schoniger et al. | 362/31 |
| 5,050,946 A | * | 9/1991 | Hathaway et al. | 385/33 |
| 5,375,043 A | * | 12/1994 | Tokunaga | 362/31 |
| 5,414,599 A | * | 5/1995 | Kaneko et al. | 362/31 |
| 5,418,384 A | * | 5/1995 | Yamana et al. | 257/88 |
| 5,433,024 A | * | 7/1995 | Lerner | 40/546 |
| 5,555,160 A | * | 9/1996 | Tawara et al. | 362/31 |
| 5,575,549 A | * | 11/1996 | Ishikawa et al. | 362/31 |
| 5,590,945 A | * | 1/1997 | Simms | 362/31 |
| 5,640,792 A | * | 6/1997 | Smith et al. | 40/546 |
| 5,664,873 A | * | 9/1997 | Kanda et al. | 362/97 |
| 5,842,297 A | * | 12/1998 | Tung | 40/546 |
| 5,857,761 A | * | 1/1999 | Abe et al. | 362/551 |
| 5,890,790 A | * | 4/1999 | Osawa | 362/27 |
| 6,134,092 A | * | 10/2000 | Pelka et al. | 361/31 |
| 6,164,791 A | * | 12/2000 | Gwo-Juh et al. | 362/31 |
| 6,305,109 B1 | * | 10/2001 | Lee | 40/546 |
| 6,443,582 B1 | * | 9/2002 | Tarne et al. | 362/27 |
| 6,464,366 B1 | * | 10/2002 | Lin et al. | 362/31 |
| 6,473,554 B1 | * | 10/2002 | Pelka et al. | 385/146 |
| 2001/0049893 A1 | * | 12/2001 | Maas et al. | 40/544 |

FOREIGN PATENT DOCUMENTS

JP        411353920 A    * 12/1999

* cited by examiner

Primary Examiner—Stephen Husar
Assistant Examiner—Hargobind S. Sawhney
(74) Attorney, Agent, or Firm—Fay, Sharpe, Fagan, Minnich & McKee, LLP

(57) ABSTRACT

A lighting apparatus (10) includes a wave guide (14) formed from a translucent material. The wave guide has a top surface (30), a bottom surface (32) that has a pre-defined curvature, and at least one side surface (34) that receives light (40) injected therein. A plurality of microstructures (36) is arranged on selected areas of the bottom surface (32) of the wave guide (14). The plurality of microstructures (36) cooperates with the pre-defined curvature of the bottom surface (32) to scatter at least a portion of the light (40) injected into the at least one side surface (34). The scattered light (42) exits the wave guide (14) through the top surface (30). At least one light emitting diode (16) injects light (40) into the at least one side surface (34) of the wave guide (14). The scattered light (42) that exits the wave guide (14) forms at least one symbol viewable by an associated observer.

16 Claims, 4 Drawing Sheets

OPTICAL WAVE GUIDE

BACKGROUND OF INVENTION

The invention relates to the lighting arts. It is especially applicable to roadway signal lighting such as pedestrian crosswalk signals (e.g., the ubiquitous walk/don't walk iconic lighted crosswalk signals found at most major urban intersections), and will be described with particular reference thereto. However, the invention will also find application in other lighting applications in which lighted icons, text, or other symbols are advantageously displayed with a wide viewing angle. The invention will additionally find application in general illumination, such as in desk lamps and illuminated magnifying glasses, where spatially and angularly uniform light output is desirable.

Lighted traffic signals are commonly used at busy traffic intersections. Such signs are visible day or night, and often include one or more symbols, such as letters, numerals, or symbolic icons, that are shown in distinctive colors. For example, the walk/don't walk pedestrian signs are typically dual signs that include a first sign indicating don't walk that shows an icon of a hand in the conventional stop position in the color red, as well as a second sign indicating walk that shows an icon of a walking person in white. Another example is the signs over traffic lanes that change direction between the morning and evening rush hours. These signs usually include a red "X" indicating an illegal lane direction, and a symbol in green indicating an acceptable direction of travel. Yet another example of traffic lighting is the conventional red, yellow, and green combination traffic control light. In this case the lights often do not display any symbols since the illuminated light color alone controls the traffic flow (i.e., green corresponds to go, yellow corresponds to caution, and "red" corresponds to "stop"). However, it is important that the traffic control light be viewable at wide viewing angles to maximize its visibility to automobile drivers and pedestrians.

Traffic signals should appear bright over a wide range of viewing angles. In the past, the use of light emitting diodes (LEDs) for such applications has been limited due to the high degree of directionality of the LED light source which restricts the effective viewing angle to angles relatively near to normal incidence. The prior art discloses use of an external lens to spread the LED light and increase the effective viewing angle. Because of the large amount of light refraction required to convert the highly directional LED light output to a more uniform beam output, conventional thick lenses are not appropriate. Instead, the prior art discloses using Fresnel lenses for this purpose. However, the use of Fresnel lenses for LED traffic signal lights has the disadvantage of typically reducing system efficiency by at least ten percent due to Fresnel losses in the lens.

The present invention contemplates an improved lighting apparatus that overcomes the above-mentioned limitations and others.

SUMMARY OF INVENTION

In accordance with one embodiment of the present invention, a lighting apparatus is disclosed. A wave guide has microstructures arranged on a surface thereof. The microstructures interact with light in the wave guide to scatter at least a portion of the light out of the wave guide in a pattern. The pattern is determined by the arrangement of the microstructures. A plurality of light emitting diodes is coupled to the wave guide and injects light into the wave guide.

In accordance with another aspect of the present invention, the pattern includes at least one of a letter, a numeral, an arrow, an iconic image of a walking man, an iconic image of a hand, an iconic image of a circle with a slash drawn there through, an iconic image indicating "pedestrian don't walk," and an iconic image indicating "pedestrian walk."

In accordance with another aspect of the present invention, the pattern further comprises light scattered at wide angles, which light is viewable at a wide range of viewing angles.

In accordance with another aspect of the present invention, a cladding comprises one of a surface coating and a cladding material. The cladding is disposed on the surface on which the microstructures are disposed. The cladding cooperates with the microstructures to effectuate the light scattering.

In accordance with another aspect of the present invention, the wave guide further comprises a tinting whereby the scattered light has a pre-selected color.

In accordance with another aspect of the present invention, the surface on which the microstructures are arranged has a pre-selected curvature.

In accordance with another aspect of the present invention, the wave guide defines a planar region. The plurality of light emitting diodes is arranged around at least a portion of a perimeter of the planar region and injects light into the planar region of the wave guide.

In accordance with another aspect of the present invention, at least a portion of the surface on which the microstructures are arranged is tilted with respect to the plane of the planar region such that the tilt cooperates with the microstructures and the plurality of light emitting diodes to effectuate the scattering of the light in the pre-determined pattern.

In accordance with another aspect of the present invention, an index-matching material is disposed at least between the plurality of light emitting diodes and the wave guide.

In accordance with another aspect of the present invention, the plurality of light emitting diodes includes a first sub-set of light emitting diodes that emit light having a first color. The plurality of light emitting diodes also includes a second sub-set of light emitting diodes that emit light having a second color that mixes with the first color in the wave guide to produce a third color.

In accordance with another embodiment of the present invention, an optical wave guide for use in conjunction with an associated light source is disclosed. A translucent material is formed into a shape having a top surface, a non-parallel bottom surface, and at least one side surface in optical communication with the associated light source. A plurality of microstructures is disposed about the bottom surface. The plurality of microstructures cooperates with the bottom surface to scatter at least a portion of light injected from the associated light source. The scattered light exits the wave guide trough the top surface.

In accordance with another aspect of the present invention, the scattered light forms a pre-selected light output pattern viewable outside the wave guide.

In accordance with another aspect of the present invention, the plurality of microstructures includes a surface roughness or texture formed into the bottom surface.

In accordance with another aspect of the present invention, a cladding material is disposed on the outside of the bottom surface. The cladding material cooperates with the plurality of microstructures to effectuate the light scattering.

In accordance with yet another embodiment of the present invention, a lighting apparatus is disclosed. A light emissive face includes a textured surface. A plurality of light producing elements are arranged about a periphery of the light emissive face. The light producing elements produce light substantially along an axis orthogonally disposed relative to the light emissive face, wherein light interacting with the textured surface is emitted from the light emissive face.

In accordance with another aspect of the present invention, the light emissive face defines a center and a perimeter where a thickness of the light emissive face at the perimeter is greater than a thickness of the light emissive face at the center.

In accordance with another aspect of the present invention, the lighting apparatus further comprises an encapsulant surrounding the plurality of light producing elements. The encapsulant abuts the light emissive face. The encapsulant matches a refractive index of the light emissive face.

In accordance with another aspect of the present invention, the textured surface forms a symbol.

In accordance with another aspect of the present invention, the textured surface comprises a plurality of microstructures arranged in a pattern on an interior side of the light emissive face.

Numerous advantages and benefits of the present invention will become apparent to those of ordinary skill in the art upon reading and understanding the following detailed description.

BRIEF DESCRIPTION OF DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION

Figure 1:
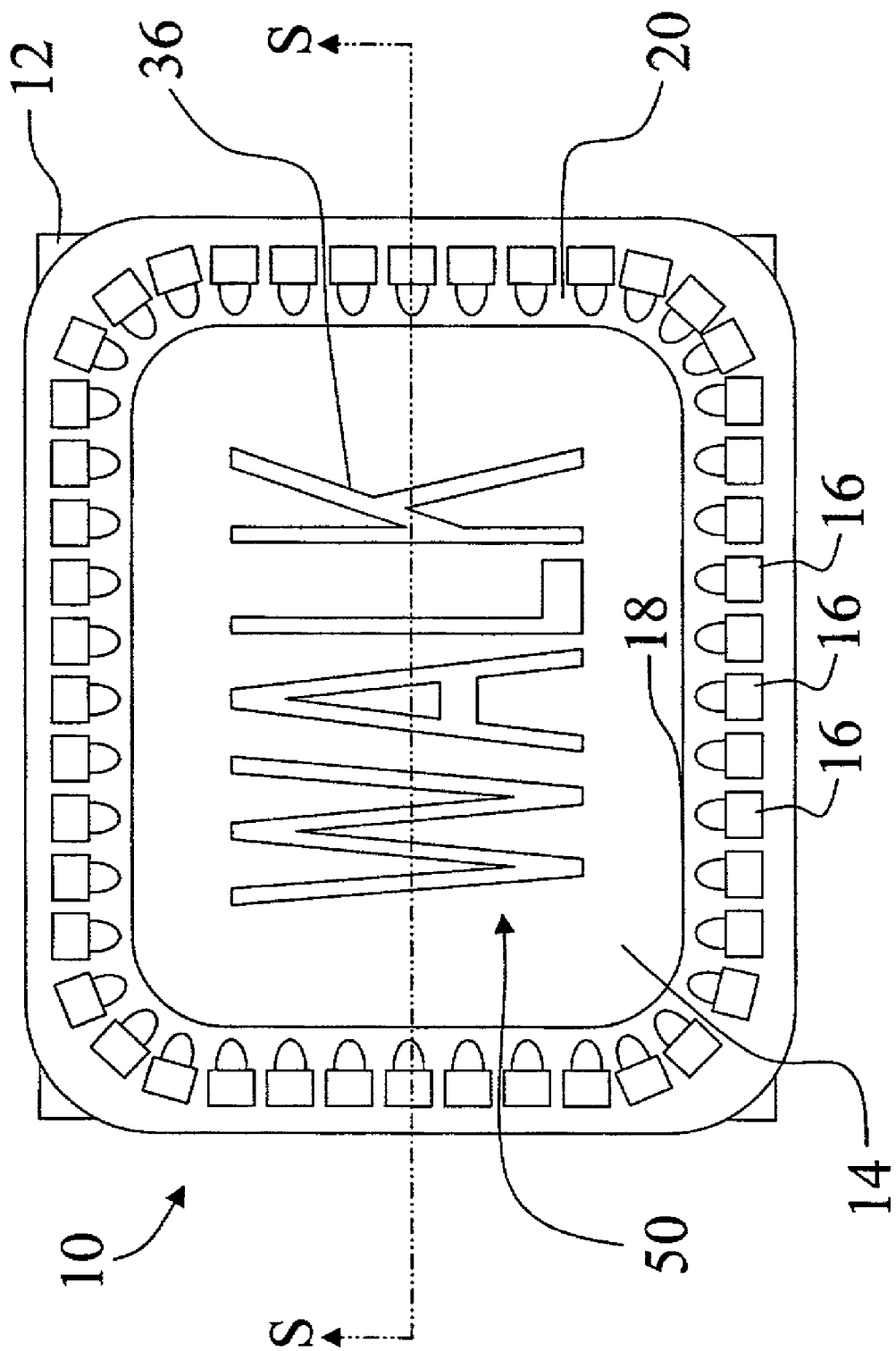
FIG. 1 shows a lighting apparatus which displays the word "WALK," that suitably practices an embodiment of the invention.

With reference to FIG. 1, a first embodiment of the invention is described. A lighting apparatus 10 includes a substrate 12 which is essentially planar. An optical wave guide 14, also essentially planar, is formed from a translucent material and is affixed to the substrate 12 using an adhesive, fasteners, or other means (not shown). The essentially planar optical wave guide 14 can be of any geometric shape, such as a circle, an oval, or a rectangle. In FIG. 1 the wave guide 14 is shown as a rectangle with rounded corners. A plurality of light emitting diodes (LEDs) 16 is mounted on the substrate 12 and surrounds the perimeter 18 of the wave guide 14. The LEDs 16 are mounted approximately at right-angles to the essentially planar wave guide 14 so that light generated by the LEDs 16 is injected into the wave guide 14. A refractive index-matching material 20 advantageously is disposed between the wave guide 14 and the LEDs 16. The index matching material 20 optionally also serves as an encapsulant for the LEDs 16, so that a sealed unitary structure comprising the wave guide 14 and the plurality of LEDs 16 is formed. Such a sealed unitary structure is advantageously essentially weatherproof and can be manufactured and utilized without external containment or lenses. The top surface of the wave guide 14, or a selected portion thereof, can be directly exposed without a lens or other covering. The lighting apparatus 10 also preferably includes an opaque coating or covering (not shown) that blocks the LEDs 16 from being directly viewed.

The wave guide 14 is formed from a translucent plastic or glass by compression molding, injection molding, or the like. The substrate 12 can be manufactured from essentially any rigid material. It will be recognized that the substrate 12 and the wave guide 14 can also be manufactured as a single unitary structure, making the overall lighting apparatus 10 highly simplified and easily manufactured as compared with lighting apparatuses of the prior art that typically include external containment and one or more external lenses.

Figure 2:
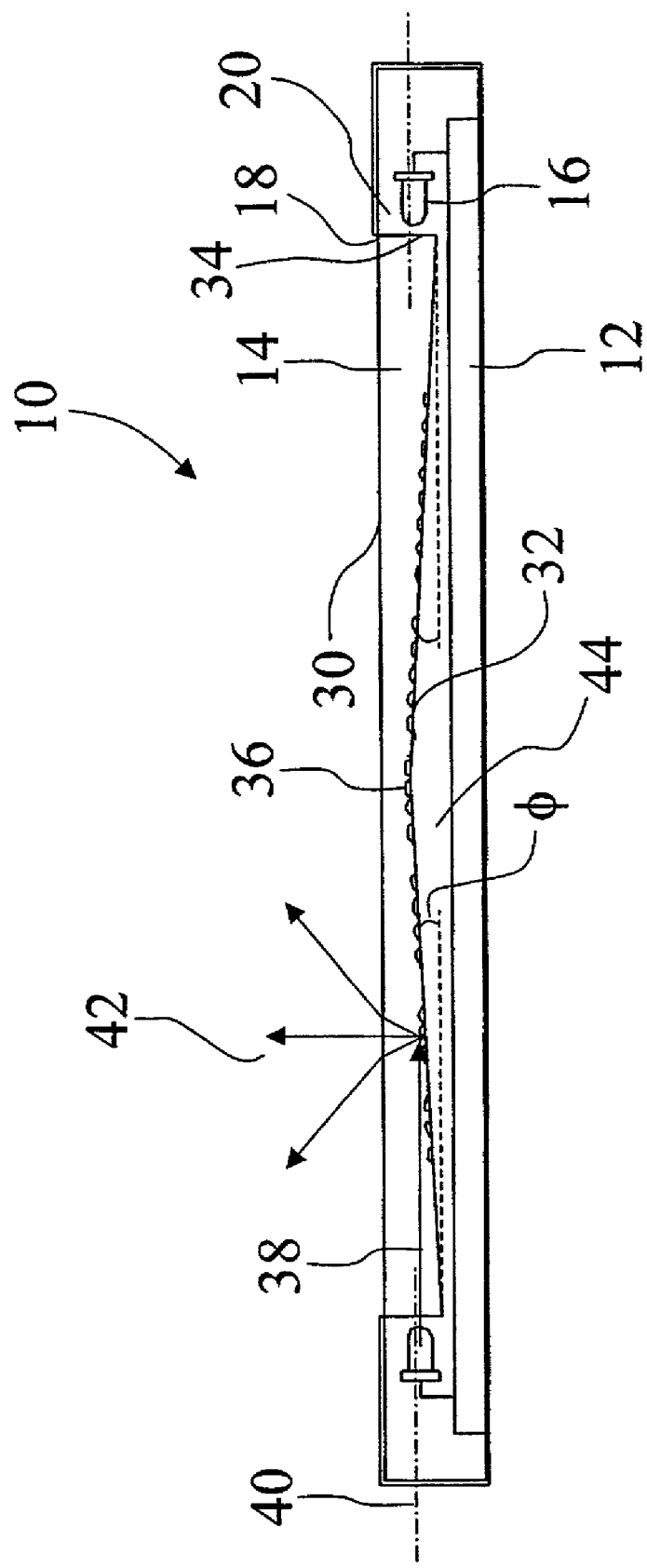
FIG. 2 shows a sectional view of the embodiment of FIG. 1 taken along the Section S—S.

With continuing reference to FIG. 1, further reference is now made to FIG. 2, which shows a sectional view of the lighting apparatus 10 taken along the Section S—S indicated in FIG. 1. The wave guide 14 includes an essentially planar light-emissive face or top surface 30, a bottom surface 32 that has a pre-defined slope or curvature, and at least one side surface 34. In the illustrated embodiment, the side surface follows the perimeter 18 of the wave guide 14, around which the LEDs 16 are arranged. In the embodiment shown in FIG. 2, the pre-defined curvature of the bottom surface 32 of the wave guide 14 includes a surface tilt of angle $\phi$ with respect to the plane of the wave guide 14, i.e. with respect to the essentially planar substrate 12. Other curvatures, such as parabolic or discontinuous (e.g., stepped) curvatures, are also contemplated for the curvature of the bottom surface 32. The bottom surface 32 also includes a plurality of microstructures 36 disposed on selected areas of the inside of the bottom surface 32.

In operation, light 38 generated by the LEDs 16 is coupled or injected into the at least one side surface 34 substantially along an axis 40 which lies at a right angle to the top surface or emissive face 30. The optical coupling is enhanced by the refractive index-matching material 20 that reduces reflection losses at the side surface 34. The injected light 38 is advantageously confined within the wave guide 14 by total internal reflection as is well known to those skilled in the art. However, the microstructures 36 that are disposed on selected areas of the bottom surface 32 act as scattering centers that scatter the guided light 38. At least a portion of the injected light 38 is converted into scattered light 42 through interaction wit the microstructures 36 on the bottom surface 32, and at least a portion of the scattered light 42 is scattered toward the top light-emissive surface 30 of the wave guide 14. That portion of the scattered light 42 that encounters the top surface 30 at an angle (respective to the surface normal of the top surface 30) that is less than the critical angle for total internal reflection at the surface 30 exits the wave guide 14 through the top surface 30 as the visible light emission of the lighting apparatus 10.

It will be appreciated by those skilled in the art that the curvature or tilting of the bottom surface 32 cooperates to enhance the scattering power of the microstructures 36. Additionally, an optional optical cladding 44, such as a cladding material or a surface coating applied to the outside of the bottom surface 32, further enhances the scattering power by increasing the optical discontinuity at the bottom surface 32. In the illustrated embodiment of FIG. 2, the cladding 44 advantageously also serves as an adhesive that bonds the wave guide 14 to the substrate 12. Of course, an optical coating or other cladding known to the art can also be used. It will also be appreciated that because the output light of the lighting apparatus 10 is the scattered light 42, rather than the direct LED radiation 38, the lighting apparatus output is essentially non-directional and produces an essentially uniform beam output that is viewable at wide angles. Optical refraction that occurs as the scattered light 42 passes through the top surface 30 also increases the viewing angle since the wave guide 14 advantageously has a higher refractive index than the surrounding air.

With continuing reference to FIGS. 1 and 2, in one embodiment the plurality of microstructures 36 is arranged on selected areas of the bottom surface 32. In FIG. 1, the microstructures 36 are arranged to display a combination of symbols 50 corresponding to the word "WALK". Thus, the embodiment of FIG. 1 is suitable for a pedestrian "WALK" signal. Because the light 38 is scattered only off the selected areas that are covered by the microstructures 36, the arrangement of microstructures 36 shown in FIG. 1 that forms the symbol combination "WALK" 50 produces a corresponding light output pattern of the lighting apparatus 10 that appears to an associated viewer as "WALK" Because the scattered light 42 is viewed, rather than the direct LED radiation 38, the text is readable at large viewing angles.

Of course, the microstructures can be selectively configured on the bottom surface 32 to display essentially any symbol or combination of symbols. For traffic control applications, commonly used symbols include one or more letters, one or more numerals, an arrow, an iconic image of a walking man (e.g., for a "WALK" pedestrian signal), an iconic image of a hand (e.g., for a "DON'T WALK" pedestrian signal), an iconic image of a circle with a slash drawn there through, an iconic image indicating "pedestrian don't walk," an iconic image indicating "pedestrian walk," and various combinations thereof. The signals for pedestrian crossings are optimized to be viewable at approximately three meters, corresponding to a typical distance across a street. Such optimization merely involves appropriate selection of the distribution and nature of the microstructures arranged on the bottom surface 32 of the wave guide 14.

Figure 3:
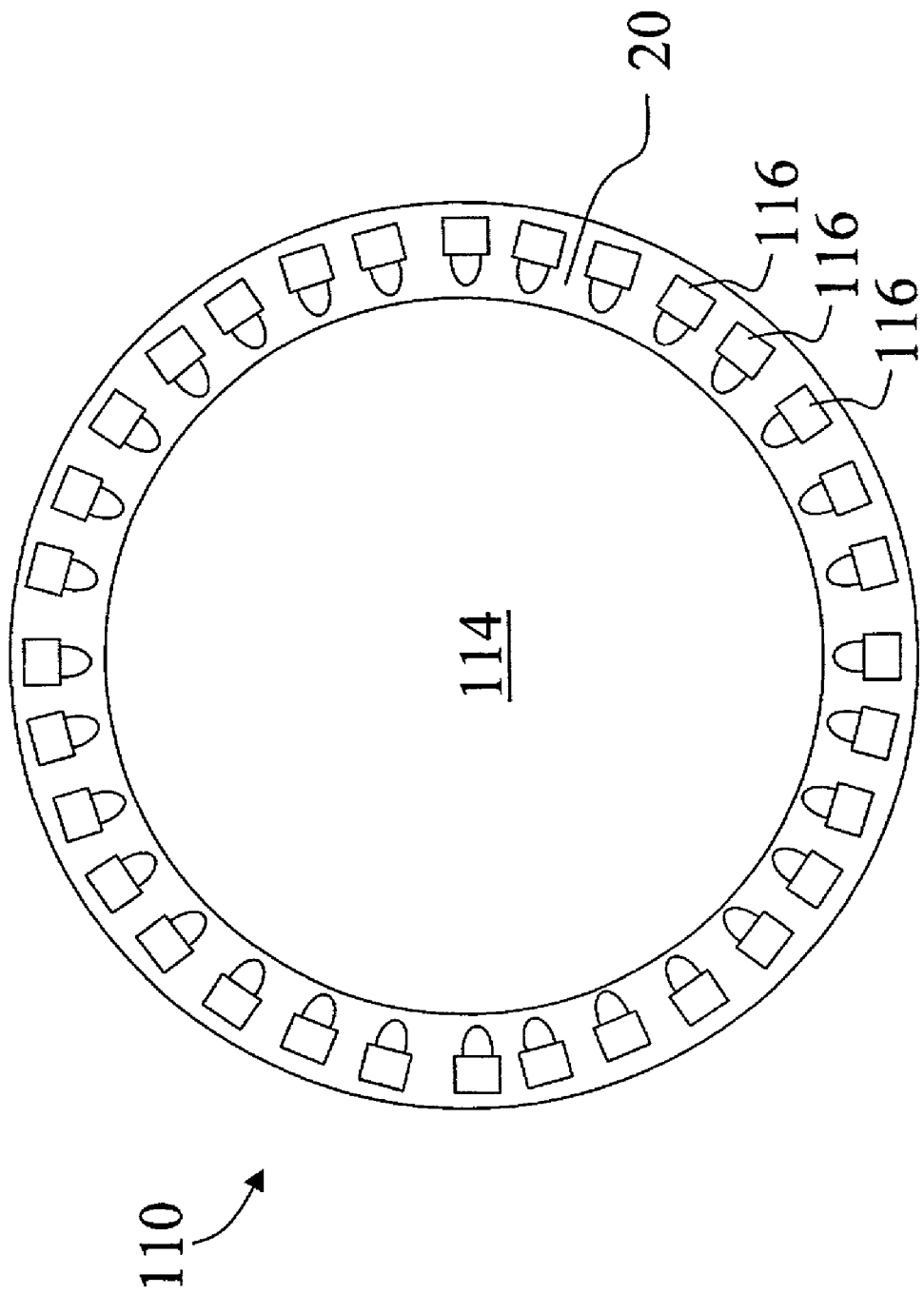
FIG. 3 shows a lighting apparatus in which a spatially uniform lighting is generated, that suitably practices another embodiment of the invention.

With reference now to FIG. 3, another embodiment 110 of the lighting apparatus is described. Rather than defining a selected symbol or combination of symbols, in the embodiment of FIG. 110 the plurality of microstructures 36 is uniformly distributed across the bottom surface of a circular wave guide 114 to form a uniform light output beam by wave guide mixing that is viewable at large angles. Th color produced by the lighting apparatus 110 can be established by using selected LEDs 116 that emit light of the selected color, e.g. red, yellow, or green LEDs. In another embodiment the LEDs 116 are white LEDs and the wave guide 114 is appropriately tinted to produce a selected color. The latter variant has the benefit of using standardized white LEDs 116 throughout.

Figure 4:
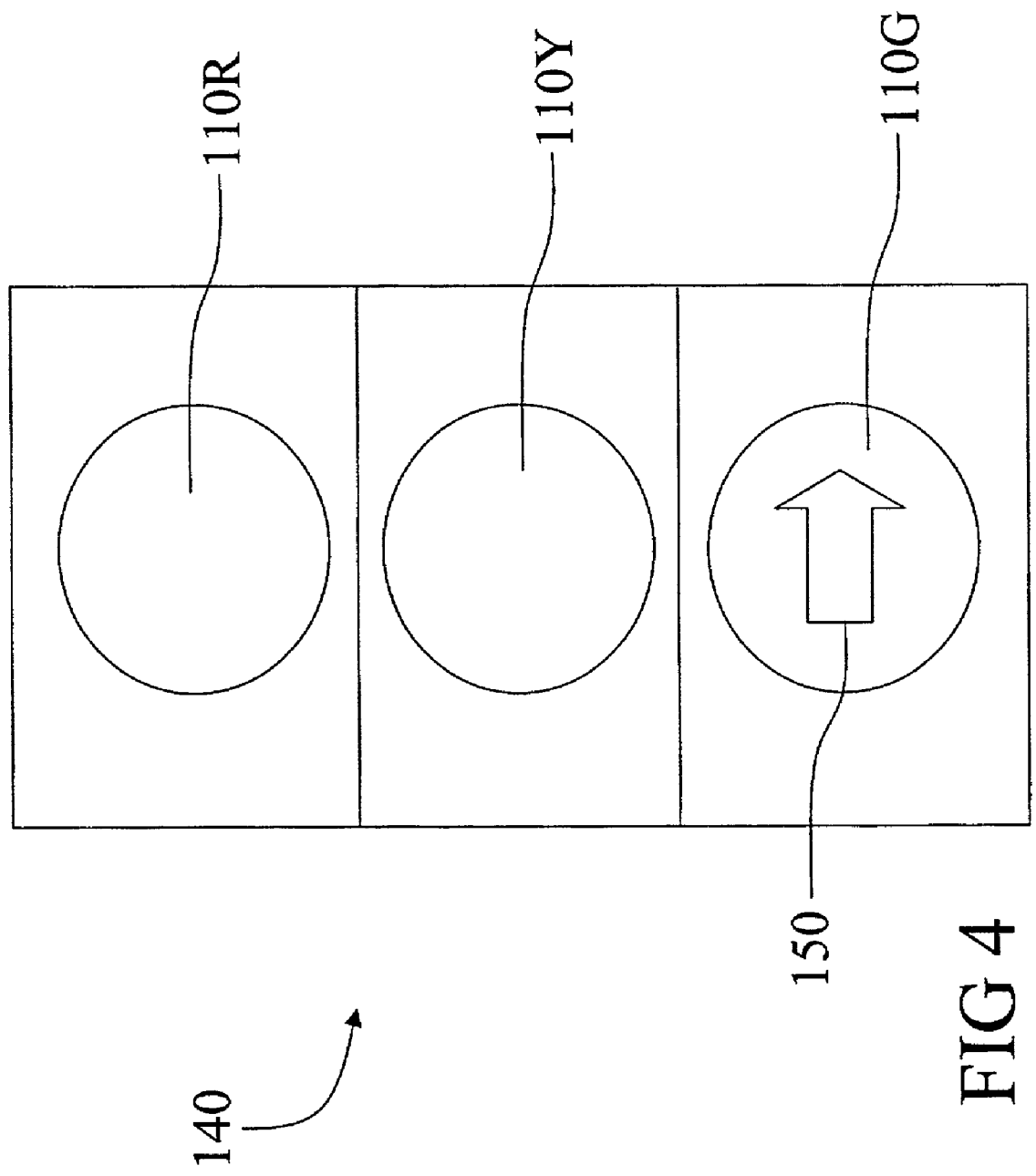
FIG. 4 shows a traffic control signal which suitably practices yet another embodiment of the invention.

An application of the lighting apparatus 110 is shown in FIG. 4, which shows a traffic control signal light 140. Three signal lights 110R, 110Y, 110G provide the red, yellow, and green light outputs of the traffic signal light 140. Of course, any of the signal lights can include symbols. In FIG. 4, the green signal light 110G includes a turn arrow 150, such as is appropriate for a traffic control signal directed to an intersection right-turn lane. The turn arrow 150 is formed in an analogous manner to the "WALK" symbol combination 50 of FIG. 1, i.e. by selective arrangement of the microstructures on the bottom surface of the wave guide.

The manufacture of the exemplary lighting apparatus 10 shown in FIGS. 1 and 2 essentially follows conventional LED packaging methods. However, the encapsulant 20 has the additional constraint of providing refractive index-matching with the translucent wave guide 14. For plastic or glass wave guides, standard encapsulants such as epoxies typically have suitable refractive index values for such index-matching. The wave guide 14 is formed by compression molding or injection molding, as mentioned previously. The microstructures 36 are advantageously formed by a surface roughness in or texturing of the bottom surface, such surface roughness or texturing being integrally molded during the molding of the wave guide 14. The wave guide 14 does not include a cladding material during manufacture, and wave guide 14 operation using only air cladding is contemplated. The optional cladding 44 disposed on the bottom surface 32 of the wave guide 14 is applied after the wave guide 14 is molded, e.g. by surface coating, extrusion coating, or the like. As mentioned previously, the optional cladding 44 can also be selected to serve as an adhesive for bonding the wave guide 14 to the substrate 12. The top surface 30 uses only air cladding to simplify manufacturing, although application of various optical coatings (not shown) to optimize the optical discontinuity at the top surface 30 are also contemplated.

In another variation, the wave guide includes a flange or the like (not shown) integrally formed into the wave guide that provides a mounting surface for the LED's 16, in which case a separate substrate component 12 is unnecessary.

Although the invention has been described with particular reference to traffic signal applications, it will be appreciated by those of ordinary skill in the art that the invention is not so limited, but rather will also find application in general illumination, such as in desk lamps and illuminated magnifying glasses, where spatially and angularly uniform light output is desirable. For example, the lighting apparatus embodiment 110 of FIG. 3 is suitable as the light source for a desk lamp, for room illumination, and the like. In an alternate embodiment, the invention will find application in light mixing applications. Considering again the embodiment 110 of FIG. 3, the plurality of LEDs 116 can optionally include two or more different types of LEDs. e.g. a sub-set of blue LEDs and a sub-set of yellow LEDs (not shown). By selectively operating one or the other sub-set of LEDs the lighting apparatus so modified can produce either blue light or yellow light. Additionally, by operating both the blue sub-set and the yellow sub-set of LEDs simultaneously, the wave guide 114 serves as a light mixing component and green light (the color combination resulting from mixing blue and yellow light) is produced. Using this approach, the three red, yellow, and green signal lights of a conventional traffic control signal can be effectuated by a single lighting apparatus (not shown) having red, yellow, and green sub-sets of LEDs, thus enabling a more compact traffic control signal light. Of course, such color combinations and light mixing can also be applied to symbolic lights such as the lighting apparatus 10 shown in FIG. 1. For example, the "WALK" signal light of FIG. 1 could be modified to include a white lighting condition for the initial portion of the walk cycle, followed by a reddish lighting condition that signifies that the end of the cycle is nearing. Of course, the LEDs can also be blinked on-and-off or otherwise intensity-modulated to provide an indication of the nearness of the end of cycle.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A lighting apparatus comprising:
   a wave guide having a substantially planar light emitting face and discrete microstructures arranged on preselected areas of a curved surface within the wave guide, said microstructures interacting with light in the wave guide to scatter at least a portion of the light out of the wave guide in a pattern, the pattern being determined by a prespecified arrangement of the microstructures and comprises of a series of localized light events each light event being associated with a respective arrangement of microstructures;
   a plurality of light emitting diodes disposed surroundingly at the wave guide periphery being coupled to the wave guide and injecting light into the wave guide, the plurality of light emitting diodes including:
      a first sub-set of light emitting diodes emitting light having a first color, and
      a second sub-set of light emitting diodes emitting light having a second color that mixes with the first color in the wave guide to produce a third color; and
   an encapsulant surrounding the plurality of light emitting diodes and abutting the wave guide, the encapsulant matching a refractive index of the wave guide.

2. The lighting apparatus as set forth in claim 1, wherein: the pattern includes at least one of a letter, a numeral, an arrow, an iconic image of a walking man, an iconic image of a hand, an iconic image of a circle with a slash drawn there through, an iconic image indicating "pedestrian don't walk", and an iconic image indicating "pedestrian walk".

3. The lighting apparatus as set forth in claim 1, wherein the pattern further comprises:
   light scattered at wide angles, said light scattered into wide angles by the microstructures, said light being viewable at a wide range of viewing angles.

4. The lighting apparatus as set forth in claim 1, further comprising:
   a cladding comprising one of a surface coating and a cladding material, said cladding being disposed on the surface on which the microstructures are disposed, said cladding cooperating with the microstructures to effectuate the light scattering.

5. The lighting apparatus as set forth in claim 1, wherein the wave guide further includes:
   a tinting whereby the scattered light has a pre-selected color.

6. The lighting apparatus as set forth in claim 1, wherein: the surface on which the microstructures are arranged has a pre-selected curvature.

7. The lighting apparatus as set forth in claim 1, wherein: the wave guide defines a planar region; and
   the plurality of light emitting diodes is arranged around at least a portion of a perimeter of the planar region and injects light into the planar region of the wave guide.

8. The lighting apparatus as set forth in claim 7, wherein: at least a portion of the surface on which the microstructures are arranged is tilted with respect to the plane of the planar region such that the tilt cooperates with the microstructures and the plurality of light emitting diodes to effectuate the scattering of the light in the pre-determined pattern.

9. The lighting apparatus as set forth in claim 1, further comprising:
   a refractive index-matching material disposed at least between the plurality of light emitting diodes and the wave guide.

10. An optical wave guide for use in conjunction with an associated light source, the optical wave guide comprising:
    a translucent material formed into a shape having a top surface, an arcuate bottom surface, and at least one side surface in optical communication with the associated light source; and
    a plurality of microstructures grouped selectively about the bottom surface, said plurality of microstructures cooperating with the bottom surface to scatter at least a portion of light injected from the associated light source, the scattered light exiting the wave guide through the top surface, wherein the scattered light forms a pre-selected light output pattern viewable outside the wave guide, the pre-selected light output pattern including a predetermined sequence of localized light events which sequence forms a human recognizable symbol combination.

11. The optical wave guide as set forth in claim 10, wherein the plurality of microstructures includes a surface roughness or texture formed into the bottom surface.

12. The optical wave guide as set forth in claim 10, further comprising:
    a cladding material disposed on the outside of the bottom surface that cooperates with the plurality of microstructures to effectuate the light scattering.

13. A lighting apparatus including:
    a light emissive wave guide including:
       a substantially planar light emissive face, and
       a curved bottom surface, which is textured in preselected localized areas, the light emissive wave guide defining a center and a perimeter, wherein a thickness of the light emissive wave guide at the perimeter is greater than a thickness of the light emissive wave guide at the center;
    an optical cladding opposed to said curved textured bottom surface, and;
    a plurality of light producing elements arranged around the perimeter of the light emissive wave guide, the light producing elements producing the light substantially along an axis orthogonally disposed relative to the light emissive wave guide, wherein the light interacting with the textured surface is emitted from the light emissive face in a series of preselected symbols each symbol corresponding to the localized area which series of symbols forms a human recognizable symbol combination.

14. The lighting apparatus as set forth in claim 13, wherein the textured surface forms a symbol.

15. The lighting apparatus as set forth in claim 13, wherein the textured surface comprises a plurality of microstructures arranged in a pattern on an interior side of the light emissive wave guide.

16. A lighting apparatus comprising:
    a light emissive wave guide including a textured surface;
    a plurality of light producing elements arranged about a periphery of the light emissive wave guide to produce light which interacts with the textured surface and is emitted by the light emissive wave guide; and
    an encapsulant surrounding the plurality of light producing elements and abutting the light emissive wave guide, the encapsulant comprises of a prespecified material having a refractive index which matches a refractive index of the light emissive wave guide.

* * * * *